(12) United States Patent
Arai (10) Patent No.: US 8,032,662 B2
(45) Date of Patent: Oct. 4, 2011

(54) MODULE CONNECTING SYSTEM (75) Inventor: Yoshinori Arai, Chiba (JP)

(73) Assignee: Fujikura Ltd., Tokyo (JP)

( * ) Notice: Subject to any disclaimer, the term of this patent is extended or adjusted under 35 U.S.C. 154(b) by 95 days.

(21) Appl. No.: 12/648,905

(22) Filed: Dec. 29, 2009

(65) Prior Publication Data

US 2010/0226447 A1    Sep. 9, 2010

(30) Foreign Application Priority Data

Jan. 7, 2009    (JP) .................. 2009-001791

(51) Int. Cl.
*G06F 13/00*    (2006.01)

(52) U.S. Cl. .................... 710/2; 710/3; 710/4
(58) Field of Classification Search .......... None
See application file for complete search history.

(56) References Cited

U.S. PATENT DOCUMENTS 5,179,670 A * 1/1993 Farmwald et al. ............ 710/104

FOREIGN PATENT DOCUMENTS

| JP | 5-307426 A | 11/1993 |
| JP | 2006-128983 A | 5/2006 |
| JP | 3930964 B2 | 6/2007 |

* cited by examiner

*Primary Examiner* — Ilwoo Park

(74) *Attorney, Agent, or Firm* — Westerman, Hattori, Daniels & Adrian, LLP

(57) ABSTRACT

An object of the present invention is to provide a module connecting system that can comply flexibly with the number of expansion modules and has an inexpensive and simple configuration. In the configuration of the module connecting system of the present invention, a basic module transmits a repetitive pulse signal to an expansion module, the repetitive pulse signal whose frequency is divided by a frequency dividing circuit included in the expansion module is output as frequency dividing information to the basic module, and the number of expansion modules is determined based on the frequency dividing information.

9 Claims, 7 Drawing Sheets

MODULE CONNECTING SYSTEM

CROSS-REFERENCES TO RELATED APPLICATIONS

The present application is based on, and claims priority from Japanese Patent Application No. 2009-001791, filed on Jan. 7, 2009, the disclosures of which is hereby incorporated by reference herein in its entirety.

BACKGROUND OF THE INVENTION

1. Field of the Invention

The present invention relates to module connecting systems in which expansion modules are connected to basic modules.

2. Description of the Related Art

Figure 1:
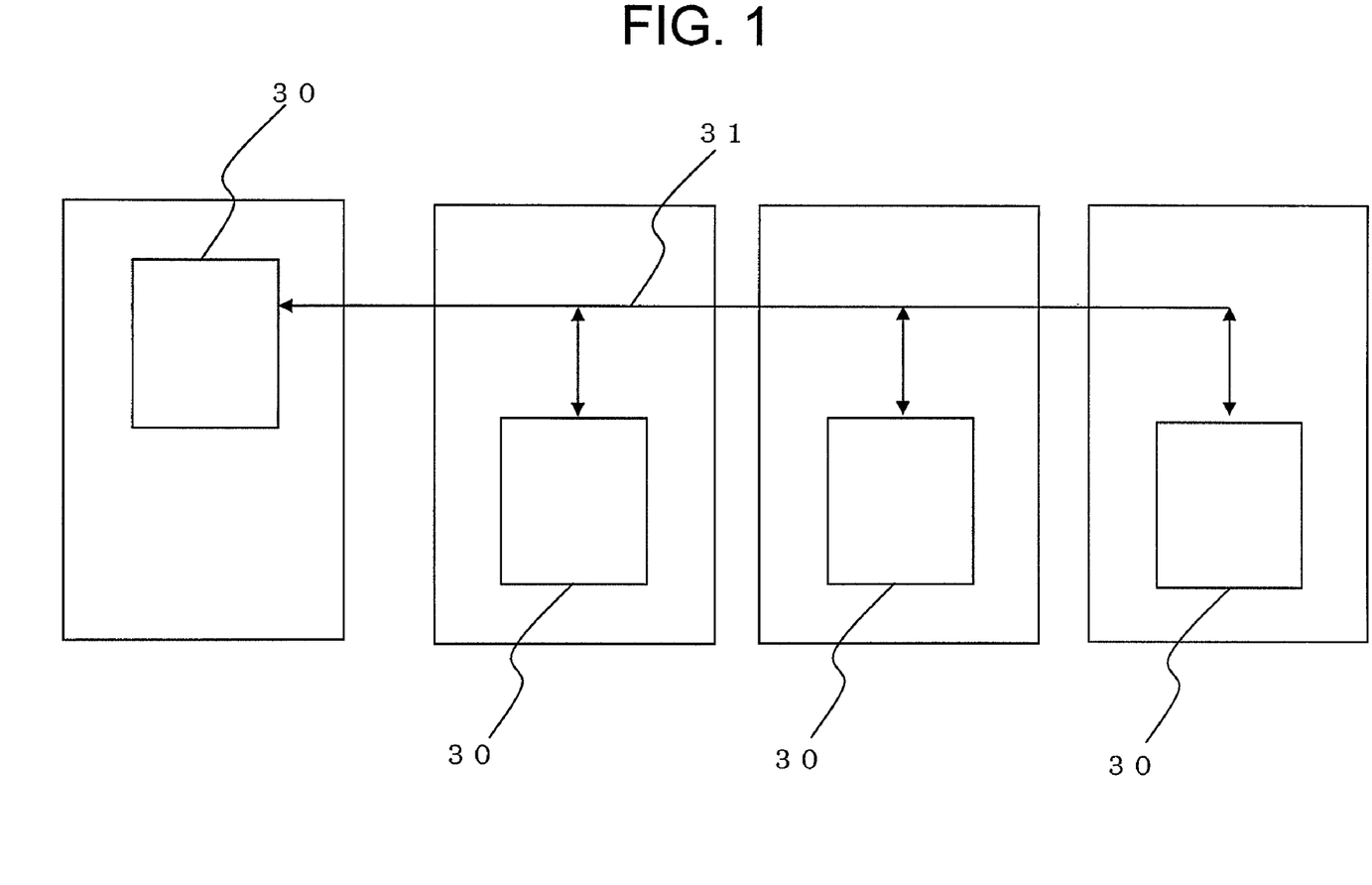
FIG. 1 illustrates a related art in which microcomputers are disposed in all modules.
Figure 2:
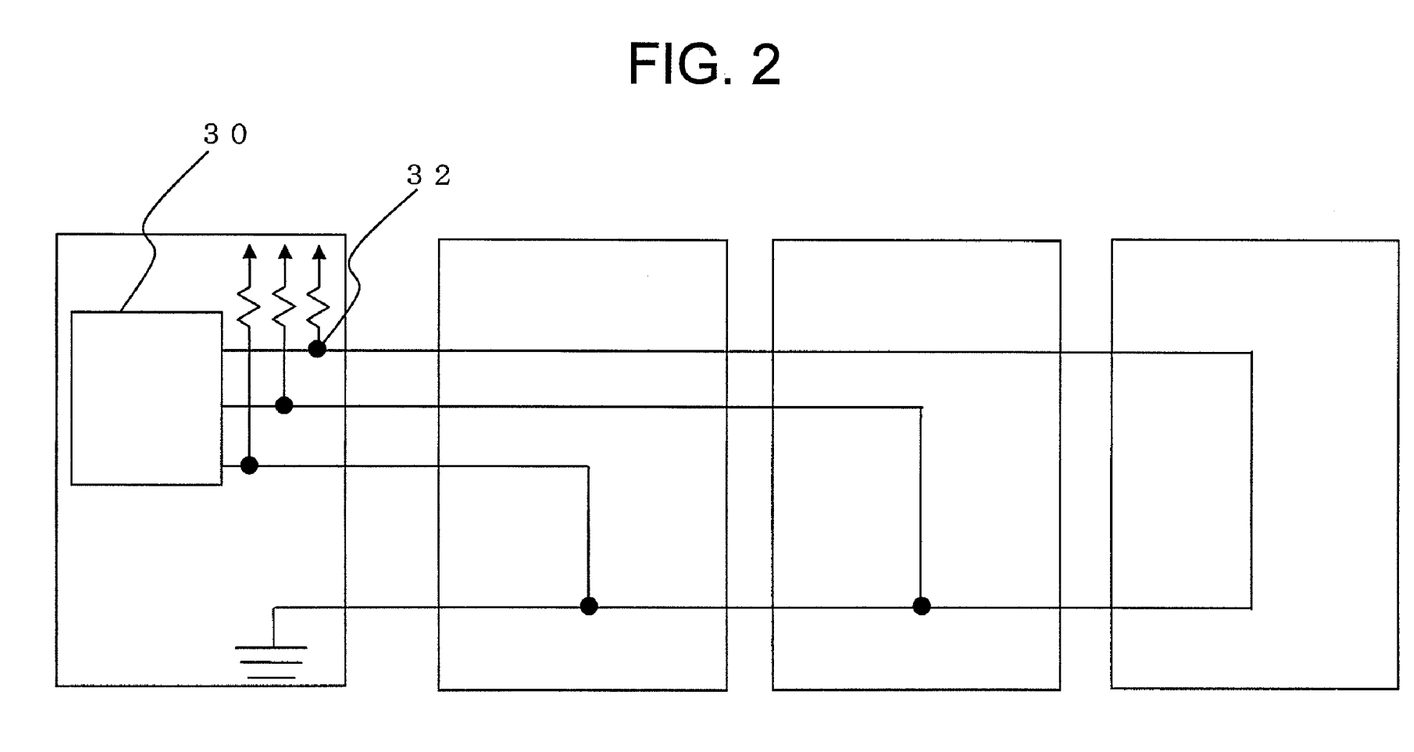
FIG. 2 illustrates a related art in which a contact sensing system is used.

In various module connecting systems such as sensor input devices to which external storage devices can be added in module units, lines such as power supply lines, input/output signal lines and data bus lines are disposed in a backboard of each module, various circuits such as a package having a sensor input function are mounted on a slot of each module, and all the modules can be connected to one another through wiring of the backboard (for example, see Japanese Patent Application Laid-open No. 5-307426). In such systems, as illustrated in FIG. 1, there is proposed a method for confirming the presence or absence of an expansion module by communication with a microcomputer incorporated in the expansion module. As illustrated in FIG. 2, there is also proposed a method for determining the presence or absence of the expansion module by a contact connected to each expansion module.

SUMMARY OF THE INVENTION

However, in the method in accordance with FIG. 1, a configuration becomes expensive because microcomputers and registers are disposed in all modules. In the method in accordance with FIG. 2, it is necessary to previously prepare contacts and signal lines depending on the number of expansion modules. Therefore, the method in accordance with FIG. 2 cannot comply flexibly with the number of expansion modules. Further, it is necessary to connect the signal lines to corresponding expansion modules, respectively. Therefore, in the method in accordance with FIG. 2, a configuration is complicated.

An object of the present invention is thus to provide a module connecting system that has a simple configuration and expandability for the number of expansion modules.

In order to achieve the object, in a configuration of a module connecting system according to the invention, a basic module transmits a repetitive pulse signal to the expansion module, the repetitive pulse signal whose frequency is divided by a frequency dividing circuit included in the expansion module is output as frequency dividing information to the basic module, and the number of expansion modules is determined based on the frequency dividing information.

In particular, a basic module according to the present invention is a basic module that is connected to a head of n (n is a positive integer) connected expansion modules, wherein the basic module is connected to the n expansion modules, the n expansion modules performing m-time (m is a positive integer) frequency dividing to a repetitive pulse signal from a direction of the basic module to output the m-time frequency-divided repetitive pulse signal to an opposite direction to the basic module, then expansion modules outputting frequency dividing information from the opposite direction to the basic module to the direction of the basic module, the basic module outputs the repetitive pulse signal to the expansion module that is connected adjacent to the basic module in the n connected expansion modules, the basic module obtains the frequency dividing information output from the expansion module that is connected adjacent to the basic module in the n connected expansion modules, and the basic module determines the number of connected expansion modules.

According to the configuration, the basic module has the expandability for the number of expansion modules, and the number of expansion modules can be determined with the simple configuration.

Expansion modules according to the present invention are n (n is a positive integer) expansion modules that are connected to a basic module, wherein the n expansion modules are connected to the basic module, the basic module outputting the repetitive pulse signal to the expansion module that is connected adjacent to the basic module in the n connected expansion modules, the basic module obtaining the frequency dividing information output from the expansion module that is connected adjacent to the basic module in the n connected expansion modules, and the basic module determining the number of connected expansion modules, the expansion module performs m-time (m is a positive integer) frequency dividing to a repetitive pulse signal from a direction of the basic module to output the m-time frequency-divided repetitive pulse signal to an opposite direction to the basic module, and the expansion module outputs frequency dividing information from the opposite direction to the basic module to the direction of the basic module.

According to the configuration, the expansion module has the expandability for the number of expansion modules, and the number of expansion modules can be determined with the simple configuration.

A module connecting system according to the present invention is a module connecting system in which n (n is a positive integer) expansion modules are connected to one basic module, wherein the basic module outputs the repetitive pulse signal to the expansion module that is connected adjacent to the basic module in the n connected expansion modules, the basic module obtains the frequency dividing information output from the expansion module that is connected adjacent to the basic module in the n connected expansion modules, and the basic module determines the number of connected expansion modules, the expansion module performs m-time (m is a positive integer) frequency dividing to a repetitive pulse signal from a direction of the basic module to output the m-time frequency-divided repetitive pulse signal to an opposite direction to the basic module, and the expansion module outputs frequency dividing information from the opposite direction to the basic module to the direction of the basic module.

According to the configuration, the module connecting system has the expandability for the number of expansion modules, and the number of expansion modules can be determined with the simple configuration.

The frequency dividing information according to the present invention is a result of logical multiplication of a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and a repetitive pulse signal output as frequency dividing information from the opposite direction to the basic module, and the basic module determines the number of connected expansion modules from a pulse duty ratio obtained from a result of logical multiplication of a repetitive pulse signal output to the expansion module that is connected adjacent to the basic module in the n connected expansion modules and a repetitive pulse signal output as frequency dividing information from the expansion module that is connected adjacent to the basic module in the n connected expansion modules.

According to the configuration, the basic module has the expandability for the number of expansion modules, and the number of expansion modules can be determined with the simple configuration.

In the expansion module according to the present invention, the basic module determines the number of connected expansion modules from a pulse duty ratio obtained from a result of logical multiplication of a repetitive pulse signal output to the expansion module that is connected adjacent to the basic module in the n connected expansion modules and a repetitive pulse signal output as frequency dividing information from the expansion module that is connected adjacent to the basic module in the n connected expansion modules, and the frequency dividing information is a result of logical multiplication of a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and a repetitive pulse signal output as frequency dividing information from the opposite direction to the basic module.

According to the configuration, the expansion module has the expandability for the number of expansion modules, and the number of expansion modules can be determined with the simple configuration. Further, expansion modules can easily be added.

The frequency dividing information according to the present invention is a result of logical multiplication of a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and a repetitive pulse signal output as frequency dividing information from the opposite direction to the basic module, and the basic module determines the number of connected expansion modules from a pulse duty ratio obtained from a result of logical multiplication of a repetitive pulse signal output to the expansion module that is connected adjacent to the basic module in the n connected expansion modules and a repetitive pulse signal output as frequency dividing information from the expansion module that is connected adjacent to the basic module in the n connected expansion modules.

According to the configuration, in the module connecting system, the number of expansion modules can be determine only by connecting the expansion modules having the same circuit and structure necessary to determine the number of expansion modules.

The frequency dividing information according to the present invention is one in which the expansion module connected to an end opposite the basic module in the n connected expansion modules returns a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and the basic module determines the number of connected expansion modules from a frequency dividing ratio of a repetitive pulse signal output as frequency dividing information from the expansion module that is connected adjacent to the basic module in the n connected expansion modules to the repetitive pulse signal output to the expansion module that is connected adjacent to the basic module in the n connected expansion modules.

According to the configuration, the basic module has the expandability, and the number of expansion modules can be determined with the simple configuration.

In the expansion module according to the present invention, the basic module determines the number of connected expansion modules from a frequency dividing ratio of a repetitive pulse signal output as frequency dividing information from the expansion module that is connected adjacent to the basic module in the n connected expansion modules to the repetitive pulse signal output to the expansion module that is connected adjacent to the basic module in the n connected expansion modules, and the frequency dividing information is one in which the expansion module connected to an end opposite the basic module in the n connected expansion modules returns a repetitive pulse signal in which the m-time (m is a positive integer) frequency dividing is performed to a repetitive pulse signal from the direction of the basic module, the m-time frequency-divided repetitive pulse signal being output to the opposite direction to the basic module.

According to the configuration, the expansion module has the expandability, and the number of expansion modules can be determined with the simple configuration. Further, expansion modules can easily be added.

In the module connecting system according to the present invention, the frequency dividing information is one in which the expansion module connected to an end opposite the basic module in the n connected expansion modules returns a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and the basic module determines the number of connected expansion modules from a frequency dividing ratio of a repetitive pulse signal output as frequency dividing information from the expansion module that is connected adjacent to the basic module in the n connected expansion modules to the repetitive pulse signal output to the expansion module that is connected adjacent to the basic module in the n connected expansion modules.

According to the configuration, in the module connecting system, the number of expansion modules can be determined only by connecting the expansion modules having the same circuit and structure necessary to determine the number of expansion modules.

The configurations may be combined wherever possible.

Accordingly, the present invention can provide the module connecting system that has the simple configuration and the expandability for the number of expansion modules.

DETAILED DESCRIPTION OF THE PREFERRED EMBODIMENTS

Exemplary embodiments of the present invention will be described with reference to the accompanying drawings. The following embodiments of the present invention are described only by way of example, and the present invention is not limited to the embodiments. In the specification and drawings, the same component is designated by the same numeral.

Figure 3:
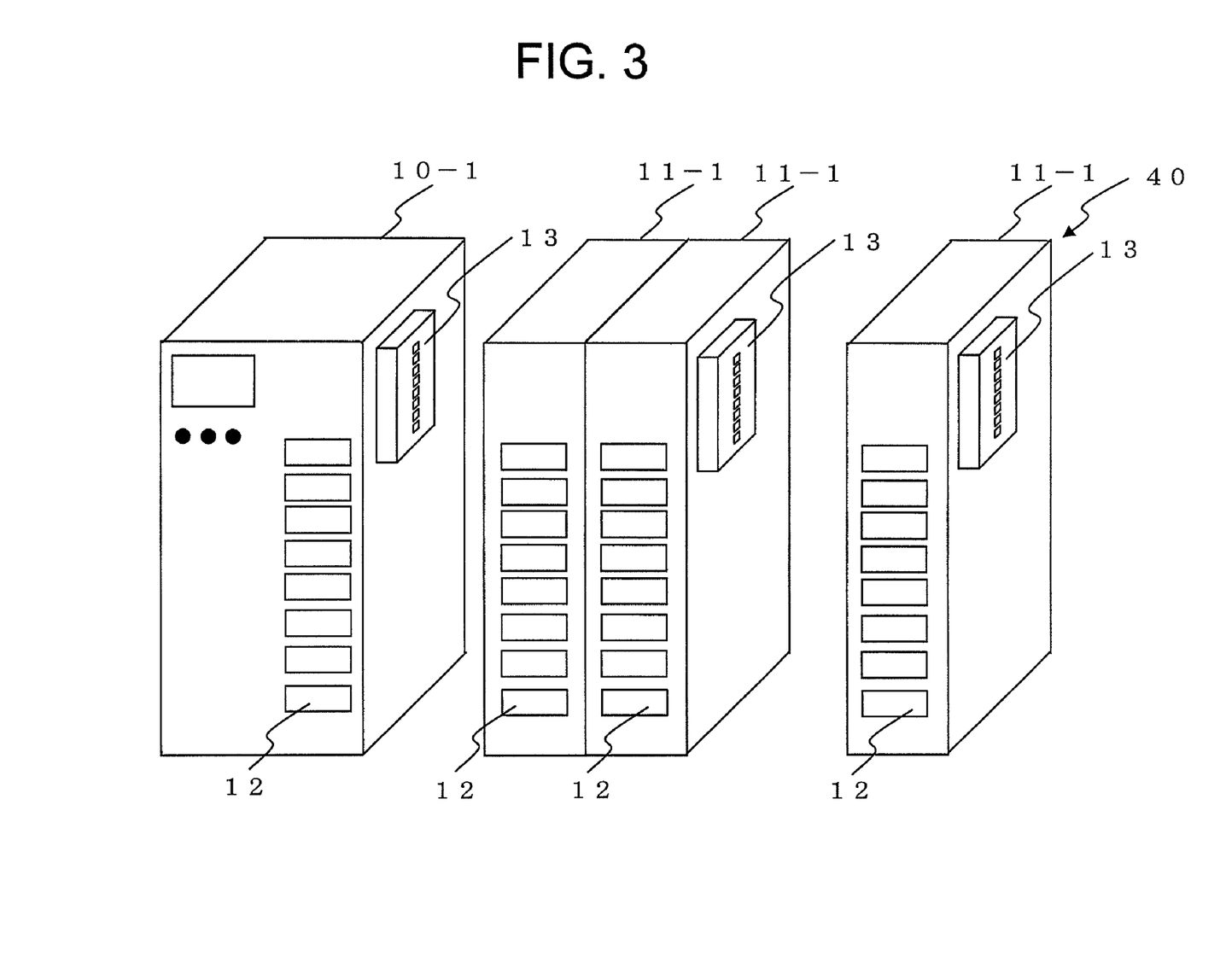
FIG. 3 illustrates a basic mode of a module connecting system according to the present invention.

FIG. 3 illustrates a basic mode 40 of a module connecting system according to the present invention. The module connecting system of the present invention includes one basic module 10-1 and n (n is a positive integer) expansion modules 11-1 connected to the basic module 10-1. The basic module 10-1 outputs a repetitive pulse signal to the expansion module 11-1 that is connected adjacent to the basic module 10-1 in the n connected expansion modules 11-1, the basic module 10-1 obtains frequency dividing information output from the expansion module 11-1 that is connected adjacent to the basic module 10-1 in the n connected expansion modules 11-1, and the basic module 10-1 determines the number of connected expansion modules 11-1. The expansion module 11-1 divides a frequency of the repetitive pulse signal from a direction of the basic module 10-1 m times (m is a positive integer) to output the m-time frequency-divided repetitive pulse signal to an opposite direction to the basic module 10-1, and the expansion module 11-1 outputs the frequency dividing information from the opposite direction to the basic module 10-1 to the direction of the basic module 10-1.

The basic module 10-1 is connected to the leading expansion module 11-1 of the n expansion modules 11-1 connected through connectors 13 in which input/output terminals and data bus terminals are disposed. The basic module 10-1 is a module that determines the number of expansion modules 11-1. The basic module 10-1 also controls a package that is optionally added to a slot 12 of the basic module 10-1 or the expansion module 11-1. The package has functions such as a sensor input.

The expansion modules 11-1 are connected through connectors 13, in which the input/output terminals and the data bus terminals are disposed, to add the slot 12 that can add the functions such as the sensor input if needed. The expansion modules 11-1 have the same circuit and structure necessary to determine the number of expansion modules 11-1. Any sequence of the expansion modules 11-1 is acceptable. There is no limitation to the number of connectable expansion modules 11-1.

First Embodiment

Figure 4:
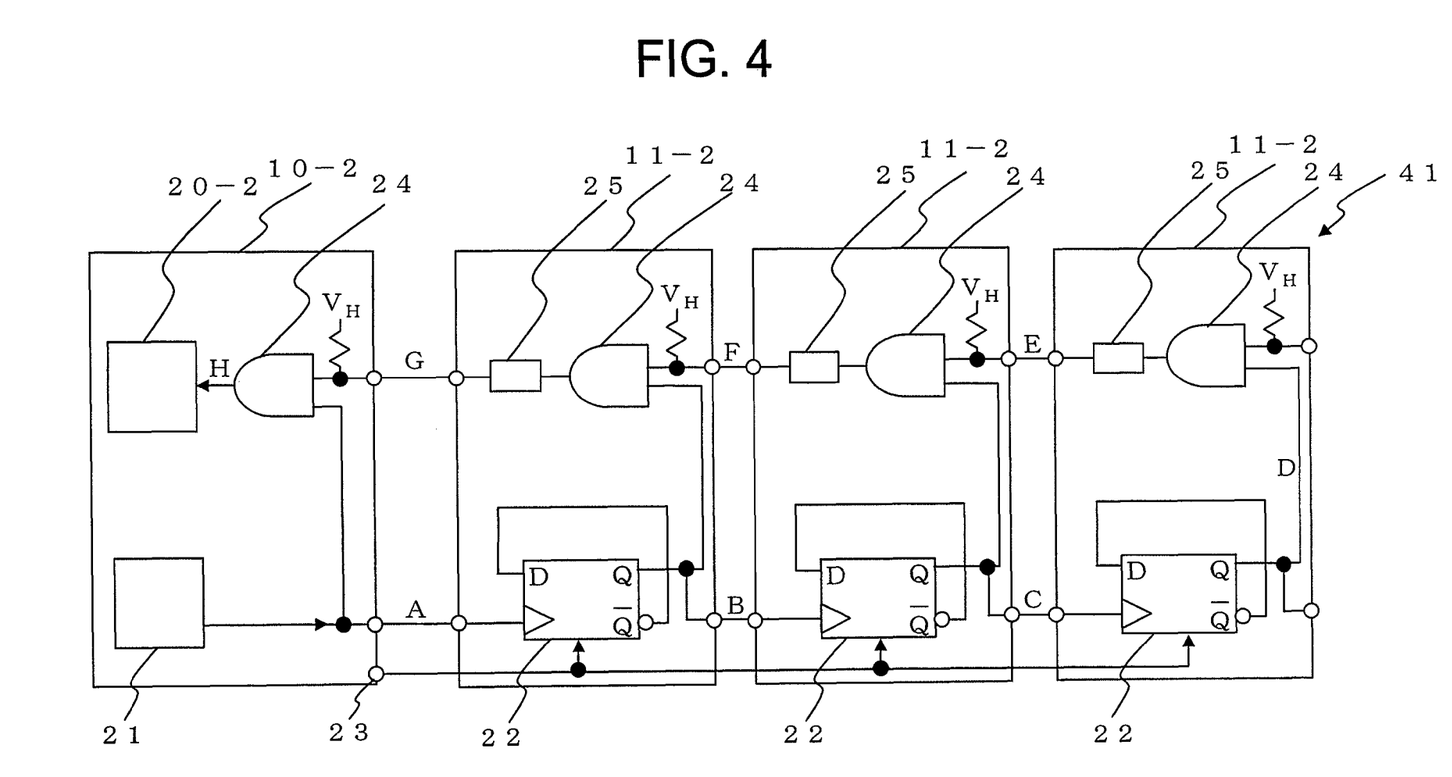
FIG. 4 illustrates a module connecting system according to a first embodiment of the present invention.

Module connecting systems according to embodiments of the present invention will be described below. FIG. 4 illustrates a module connecting system 41 according to a first embodiment of the present invention. Three expansion modules 11-2 are connected to a basic module 10-2 by way of example. FIG. 4 illustrates a basic module 10-2, expansion modules 11-2, a determination circuit 20-2, a repetitive pulse signal transmitting circuit 21, frequency dividing circuits 22 formed by D-type flipflop circuits, a reset terminal 23, logical multiplication circuits 24, and lowpass filters 25. Hereinafter, the description of the same component as the basic mode is omitted.

FIG. 5 illustrates pulse signals that exhibit the frequency dividing states and frequency dividing information of repetitive pulse signals. FIG. 5A illustrates the pulse signal at a point A of FIG. 4, FIG. 5B illustrates the pulse signal at a point B of FIG. 4, FIG. 5C illustrates the pulse signal at a point C of FIG. 4, FIG. 5D illustrates the pulse signal at a point D of FIG. 4, FIG. 5E illustrates the pulse signal at a point E of FIG. 4, FIG. 5F illustrates the pulse signal at a point F of FIG. 4, FIG. 5G illustrates the pulse signal at a point G of FIG. 4, and FIG. 5H illustrates the pulse signal at a point H of FIG. 4. FIG. 5 is described by a positive logic.

Referring to FIG. 4, the repetitive pulse signal transmitting circuit 21 transmits a repetitive pulse signal to obtain the frequency dividing information for determining the number of connected expansion modules 11-2. Each expansion module 11-2 outputs a result of logical multiplication of the repetitive pulse signal in which the m-time frequency dividing is performed to the repetitive pulse signal from the direction of the basic module 10-2 and the pulse signal that is output as the frequency dividing information from the opposite direction to the basic module 10-2 as new frequency dividing information. The determination circuit 20-2 included in the basic module 10-2 computes a duty ratio to determine the number of connected expansion modules 11-2. The duty ratio is obtained from a result of logical multiplication of the repetitive pulse signal that is output to the expansion module 11-2 connected adjacent to the basic module 10-2 in n connected expansion modules 11-2 and the pulse signal that is output as the frequency dividing information from the expansion module 11-2 connected adjacent to the basic module 10-2 in the n connected expansion modules 11-2.

The frequency dividing circuit 22 included in the expansion module 11-2 is a sequential circuit formed by the D-type flipflop circuit, the frequency dividing circuit 22 performs m-time frequency dividing to the fed repetitive pulse signal, and the frequency dividing circuit 22 outputs the repetitive pulse signal while a period of the repetitive pulse signal is increased m times. In the first embodiment, m is set to 2. The frequency dividing circuit 22 of the first embodiment divides the frequency of the repetitive pulse signal output from the basic module 10-2 or another expansion module 11-2 into a half frequency.

The duty ratio is a ratio of a high interval and a low interval, which emerge in one period of the pulse signal as the frequency dividing information that is obtained by the logical multiplication circuit 24. The duty ratio depends on the number of expansion modules 11-2. The pulse signal to which the m-time frequency dividing is performed through the n frequency dividing circuits 22 becomes the duty ratio of $1:m^{n+1}-1$. The total number of expansion modules 11-2 connected to the module connecting system can be determined from the duty ratio.

The logical multiplication circuit 24 operates the logical multiplication of the repetitive pulse signal fed from the direction of the basic module 10-2 and the pulse signal that is of the frequency dividing information fed from the direction of the expansion module 11-2 connected adjacent to the basic module 10-2. Because a noise increases in the repetitive pulse signal with increasing number of connected expansion modules 11-2, preferably the lowpass filter 25 is combined the logical multiplication circuit 24 to prevent the noise. The reset terminal 23 is disposed to return the frequency dividing circuit 22 to an initial state.

An operation of the module connecting system 41 of the first embodiment of the present invention will be described with reference to FIGS. 4 and 5. The repetitive pulse signal (see FIG. 5A) that is output from the repetitive pulse signal transmitting circuit 21 included in the basic module 10-2 is fed through the point A of FIG. 4 into the frequency dividing circuit 22 of the expansion module 11-2 connected to the basic module 10-2. The frequency of the fed repetitive pulse signal is divided into a half frequency by the frequency dividing circuit 22 of the expansion module 11-2 connected to the basic module 10-2 (see FIG. 5B) and output through the point B of FIG. 4 to the direction of the expansion module 11-2 that is connected in the opposite direction to the basic module 10-2. The repetitive pulse signal whose frequency is divided into the half frequency is further divided into a half frequency by the frequency dividing circuit 22 of the expansion module 11-2 connected in the opposite direction to the basic module 10-2, and therefore the repetitive pulse signal to which the twice frequency dividing is performed with respect to the repetitive pulse signal at the point A (see FIG. 5C). Then the repetitive pulse signal to which the twice frequency dividing is performed is output through the point C of FIG. 4 to the direction of the expansion module 11-2 connected in the opposite direction to the basic module 10-2. The repetitive pulse signal to which the twice frequency dividing is performed is further divided into a half frequency by the frequency dividing circuit 22 of the expansion module 11-2 connected in the opposite direction to the basic module 10-2, and the eight-time frequency dividing is performed to the repetitive pulse signal with respect to the repetitive pulse signal at the point A (see FIG. 5D).

Figure 5A:
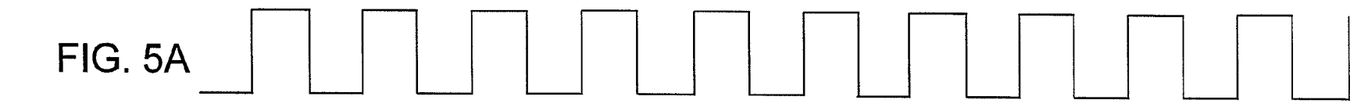
FIG. 5 illustrates an operation of the module connecting system of the first embodiment of the present invention.
Figure 5B:
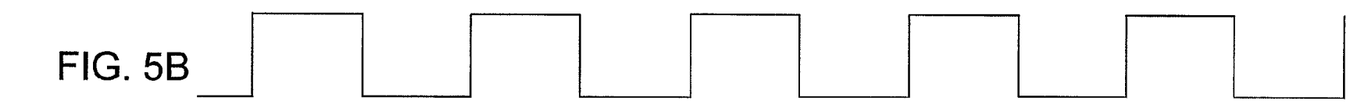
Figure 5C:
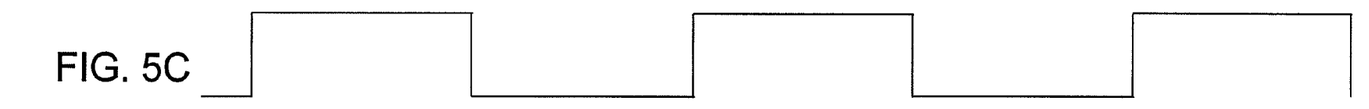
Figure 5D:
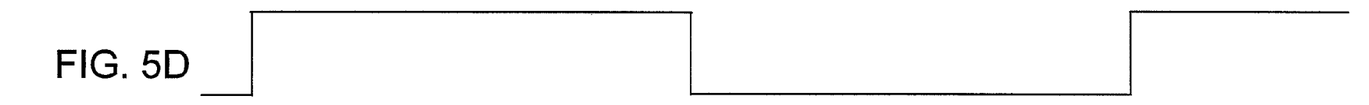
Figure 5E:
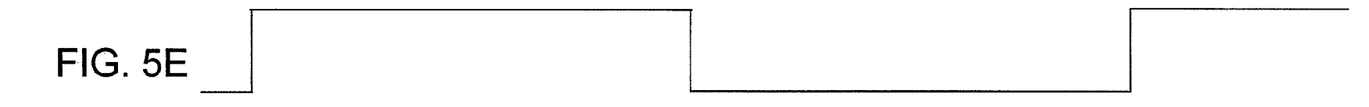
Figure 5F:
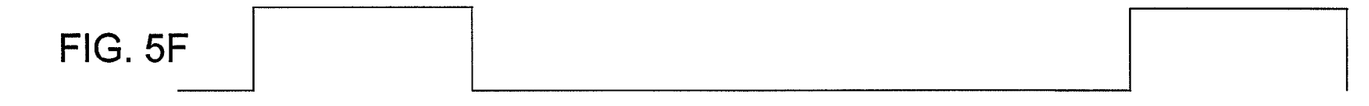
Figure 5G:
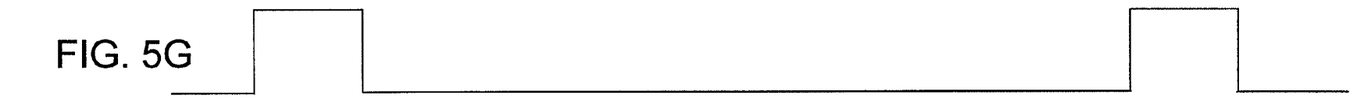
Figure 5H:
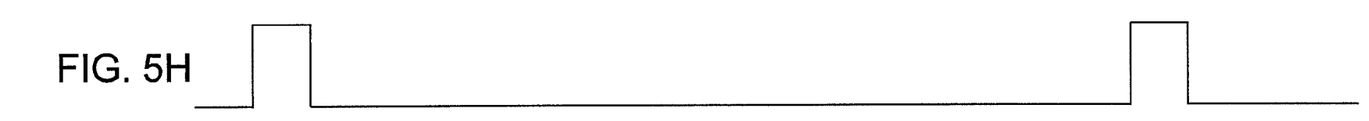

The repetitive pulse signal to which the eight-time frequency dividing is performed is returned from the point D to the point E in the direction of the basic module 10-2 at the point D of FIG. 4 and output through the point E of FIG. 4 to the direction of the basic module 10-2. The logical multiplication of the pulse signal of FIG. 5E that is of the frequency dividing information and the repetitive pulse signal of FIG. 5C is operated (see FIG. 5F), and the operated pulse signal is output to the direction of the basic module 10-2 through the point F of FIG. 4. The logical multiplication of the pulse signal of FIG. 5F that is of the frequency dividing information and the repetitive pulse signal of FIG. 5B is operated (see FIG. 5G), and the operated pulse signal is output to the direction of the basic module 10-2 through the point G of FIG. 4. The logical multiplication of the pulse signal of FIG. 5G that is of the frequency dividing information and the repetitive pulse signal of FIG. 5A is operated (see FIG. 5H), and the operated pulse signal is output to the determination circuit 20-2 through the point H of FIG. 4. The duty ratio of the repetitive pulse signal of FIG. 5H fed into the determination circuit 20-2 becomes 1.15 from the duty ratio of 1:1 of the repetitive pulse signal of FIG. 5A. Because the expansion module 11-2 includes the frequency dividing circuit 22 that divides the frequency of the pulse signal into the half frequency, the determination circuit 20-2 confirms that the repetitive pulse signal passes through the frequency dividing circuit 22 three times from $15=2^{n+1}-1=2^{3+1}-1$, and the determination circuit 20-2 determines that the number of expansion modules 11-2 is 3. In the first embodiment, m is set to 2 by way of example. However, m is not limited to 2. For example, m may be set to 2 or more. In the first embodiment, n is set to 3 by way of example. Alternatively, n may be set to a positive integer of 1 or more. Accordingly, in the module connecting system 41 of the first embodiment, the number of expansion modules 11-2 can be determined only by adding the expansion module 11-2.

Second Embodiment

Figure 6:
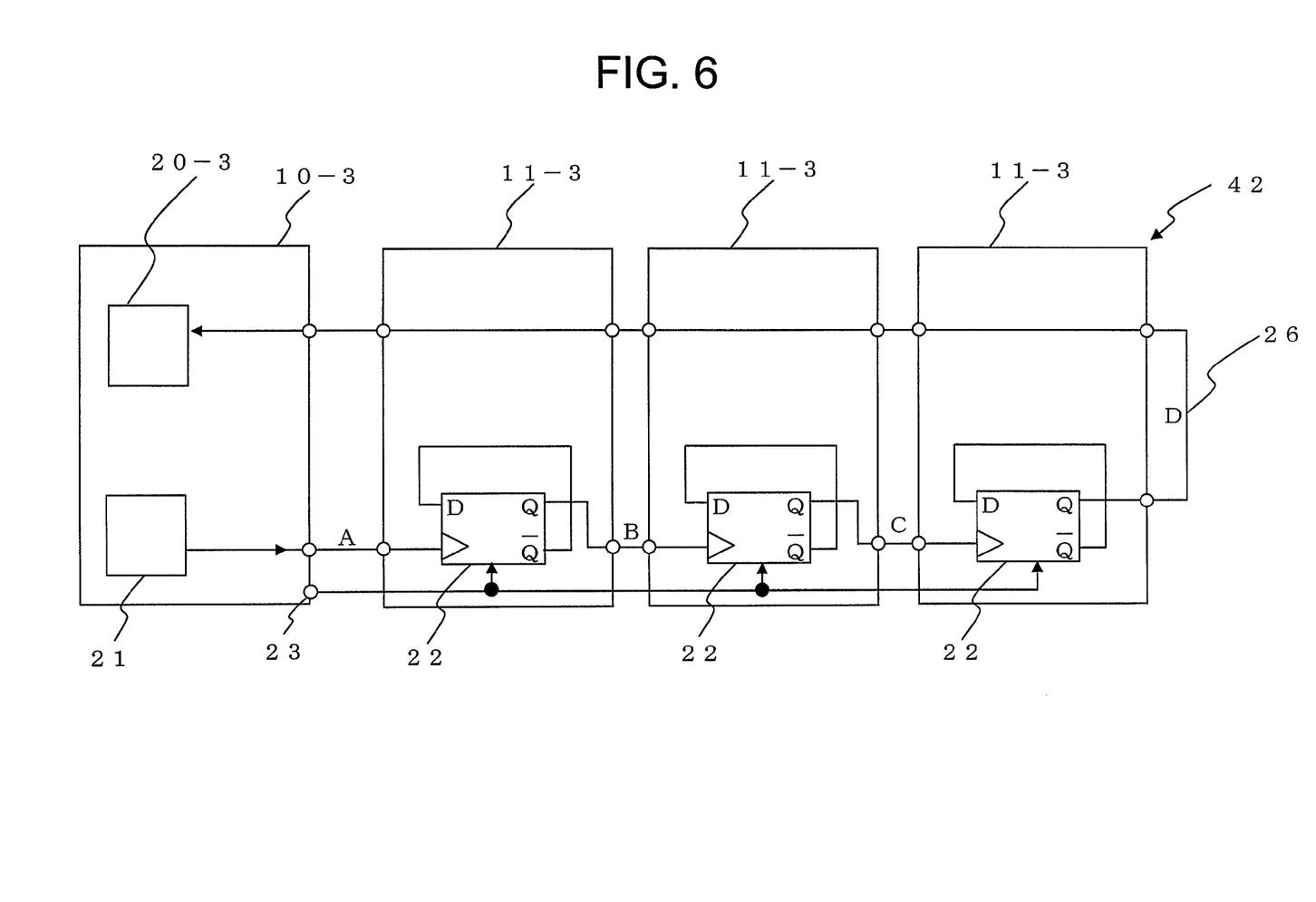
FIG. 6 illustrates a module connecting system according to a second embodiment of the present invention.
Figure 7A:
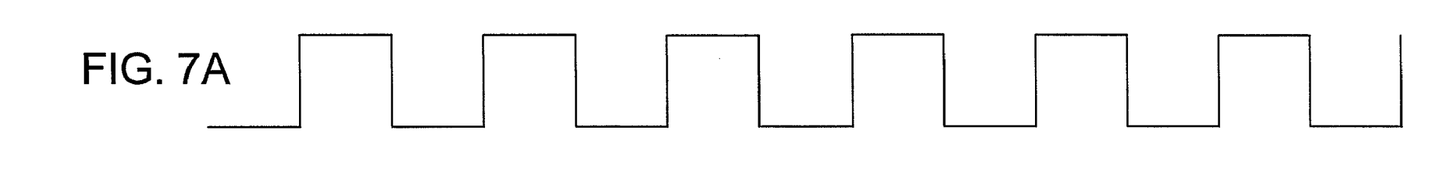
FIG. 7 illustrates an operation of the module connecting system of the second embodiment.
Figure 7B:
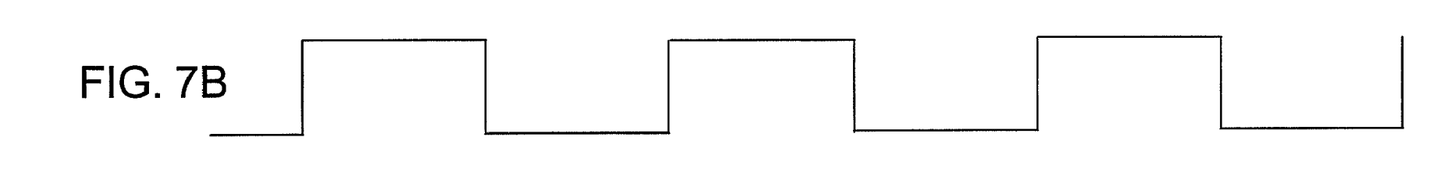
Figure 7C:
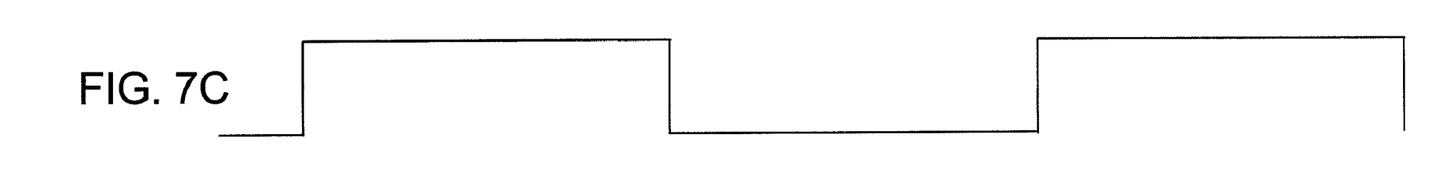
Figure 7D:
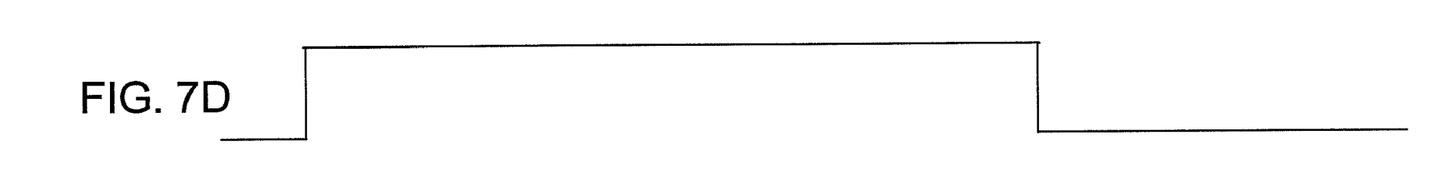

FIG. 6 illustrates a module connecting system 42 according to a second embodiment of the present invention. By way of example, three expansion modules 11-3 are connected to a basic module 10-3. FIG. 6 illustrates a basic module 10-3, expansion modules 11-3, a determination circuit 20-3, a repetitive pulse signal transmitting circuit 21, frequency dividing circuits 22 formed by D-type flipflop circuits, a reset terminal 23, and repetitive pulse signal returning means 26. Hereinafter, the description of the same component as the first embodiment is omitted.

FIG. 7 illustrates pulse signals that exhibit the frequency dividing states and frequency dividing information of repetitive pulse signals. FIG. 7A illustrates the pulse signal at a point A of FIG. 6, FIG. 7B illustrates the pulse signal at a point B of FIG. 6, FIG. 7C illustrates the pulse signal at a point C of FIG. 6, and FIG. 7D illustrates the pulse signal at an interval D of FIG. 6. The interval D is located from an output terminal of the frequency dividing circuit 22 included in the expansion module 11-3 to an input terminal of the determination circuit 20-3 included in the basic module 10-3. FIG. 7 is described by a positive logic.

Referring to FIG. 6, the repetitive pulse signal transmitting circuit 21 transmits a repetitive pulse signal to obtain the frequency dividing information for determining the number of connected expansion modules 11-3. In the n connected expansion modules 11-3, the expansion module 11-3 connected to an end opposite the basic module 10-3 performs m-time (m is a positive integer) frequency dividing to the repetitive pulse signal that is output from the direction of the basic module 10-3 to the expansion module 11-3 connected adjacent to the basic module 10-3, and the expansion module 11-3 connected to an end opposite the basic module 10-3 returns the pulse signal to which the m-time frequency dividing is performed as the frequency dividing information. The determination circuit 20-3 included in the basic module 10-3 determines the number of connected expansion modules 11-3 from a frequency dividing ratio. The frequency dividing ratio is a ratio of the m-time frequency-divided repetitive pulse signal that is output as the frequency dividing information from expansion module 11-3 connected adjacent to the basic module 10-3 in the n connected expansion modules 11-3 to the repetitive pulse signal that is output to the expansion module 11-3 connected adjacent to the basic module 10-3 in the n connected expansion modules 11-3.

The expansion module 11-3 includes the returning means 26 for returning the m-time frequency-divided repetitive pulse signal when the expansion module 11-3 is connected to a termination of the module connecting system 42. Any means, such as a pin that connects the output terminal of the frequency dividing circuit 22 included in the expansion module 11-3 and the input terminal of the determination circuit 20-3 included in the basic module 10-3 and a switch that switches between connection and disconnection, may be used as the returning means 26 for returning the m-time frequency-divided repetitive pulse signal. The reset terminal 23 is disposed to return the frequency dividing circuit 22 to the initial state.

An operation of the module connecting system 42 of the second embodiment of the present invention will be described with reference to FIGS. 6 and 7. The repetitive pulse signal (see FIG. 7A) that is output from the repetitive pulse signal transmitting circuit 21 included in the basic module 10-3 is fed through the point A of FIG. 6 into the frequency dividing circuit 22 of the expansion module 11-3 connected adjacent to the basic module 10-3. The frequency of the fed repetitive pulse signal is divided into a half frequency by the frequency dividing circuit 22 of the expansion module 11-3 connected in the opposite direction to the basic module 10-3 (see FIG. 7B) and output through the point B of FIG. 6 to the expansion module 11-3 connected in the opposite direction to the basic module 10-3. The repetitive pulse signal whose frequency is divided into the half frequency is further divided into a half frequency by the frequency dividing circuit 22 of the expansion module 11-3 connected in the opposite direction to the basic module 10-3, and therefore the repetitive pulse signal to which the twice frequency dividing is performed with respect to the repetitive pulse signal at the point A (see FIG. 7C). Then the repetitive pulse signal to which the twice frequency dividing is output through the point C of FIG. 6 to the expansion module 11-3 connected in the opposite direction to the basic module 10-3. The repetitive pulse signal to which the twice frequency dividing is performed is further divided into a half frequency by the frequency dividing circuit 22 of the expansion module 11-3 connected in the opposite direction to the basic module 10-3, and therefore the eight-time frequency dividing is performed to the repetitive pulse signal with respect to the repetitive pulse signal at the point A (see FIG. 7D).

The repetitive pulse signal to which the eight-time frequency dividing is fed into the determination circuit 20-3 included in the basic module 10-3 at the interval D of FIG. 6. The determination circuit 20-3 confirms that the repetitive pulse signal of FIG. 7A passes through the frequency dividing circuit 22 three times from the fed three-time frequency-divided repetitive pulse signal, and the determination circuit 20-3 determines that the number of expansion modules 11-3 is 3. In the second embodiment, m is set to 2 by way of example. However, m is not limited to 2. For example, m may be set to 2 or more. In the second embodiment, n is set to 3 by way of example. Alternatively, n may be set to a positive integer of 1 or more. Accordingly, the determination circuit 20-3 can determine the number of expansion modules 11-3 only by adding the expansion module 11-3 having the same configuration of the circuit and structure necessary to determine the number of expansion modules 11-3.

For example, the module connecting system of the present invention is applicable to external storage devices and sensor input devices.

REFERENCE SIGNS LIST 10-1, 10-2, 10-3 basic module
11-1, 11-2, 11-3 expansion module
12 slot
13 connector
20-2, 20-3 determination circuit
21 repetitive pulse signal transmitting circuit
22 frequency dividing circuit
23 reset terminal
24 logical multiplication circuit
25 lowpass filter
26 repetitive pulse signal returning means
30 microcomputer for detecting expansion module
31 data bus signal line
32 junction for detecting expansion module
40, 41, 42 module connecting system

What is claimed is:

1. A basic module that is connected to a head of n (n is a positive integer) connected expansion modules,
    wherein the basic module is connected to the n expansion modules, the n expansion modules performing m-time (m is a positive integer) frequency dividing to a repetitive pulse signal from a direction of the basic module to output the m-time frequency-divided repetitive pulse signal to an opposite direction to the basic module, the n expansion modules outputting frequency dividing information from the opposite direction to the basic module to the direction of the basic module,
    the basic module outputs the repetitive pulse signal to the expansion module that is connected adjacent to the basic module in the n connected expansion modules, the basic module obtains the frequency dividing information output from the expansion module that is connected adjacent to the basic module in the n connected expansion modules, and the basic module determines the number of connected expansion modules.

2. The basic module according to claim 1, wherein the frequency dividing information is a result of logical multiplication of a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and a repetitive pulse signal output as frequency dividing information from the opposite direction to the basic module, and
    the number of connected expansion modules is determined from a pulse duty ratio obtained from a result of logical multiplication of a repetitive pulse signal output to the expansion module that is connected adjacent to the basic module in the n connected expansion modules and a repetitive pulse signal output as frequency dividing information from the expansion module that is connected adjacent to the basic module in the n connected expansion modules.

3. The basic module according to claim 1, wherein the frequency dividing information is one in which the expansion module connected to an end opposite the basic module in the n connected expansion modules returns a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and
    the number of connected expansion module is determined from a frequency dividing ratio of a repetitive pulse signal output as frequency dividing information from the expansion module that is connected adjacent to the basic module in the n connected expansion modules to the repetitive pulse signal output to the expansion module that is connected adjacent to the basic module in the n connected expansion modules.

4. N (n is a positive integer) expansion modules that are connected to a basic module,
    wherein the n expansion modules are connected to the basic module, the basic module outputting the repetitive pulse signal to the expansion module that is connected adjacent to the basic module in the n connected expansion modules, the basic module obtaining the frequency dividing information output from the expansion module that is connected adjacent to the basic module in the n connected expansion modules, and the basic module determining the number of connected expansion modules,
    the expansion module performs m-time (m is a positive integer) frequency dividing to a repetitive pulse signal from a direction of the basic module to output the m-time frequency-divided repetitive pulse signal to an opposite direction to the basic module, and the expansion module outputs frequency dividing information from the opposite direction to the basic module to the direction of the basic module.

5. The expansion module according to claim 4, wherein the basic module determines the number of connected expansion modules from a pulse duty ratio obtained from a result of logical multiplication of a repetitive pulse signal output to the expansion module that is connected adjacent to the basic module in the n connected expansion modules and a repetitive pulse signal output as frequency dividing information from the expansion module that is connected adjacent to the basic module in the n connected expansion modules, and the frequency dividing information is a result of logical multiplication of a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and a repetitive pulse signal output as frequency dividing information from the opposite direction to the basic module.

6. The expansion module according to claim 4, wherein the basic module determines the number of connected expansion module from a frequency dividing ratio of a repetitive pulse signal output as frequency dividing information from the expansion module that is connected adjacent to the basic module in the n connected expansion modules to the repetitive pulse signal output to the expansion module that is connected adjacent to the basic module in the n connected expansion modules, and the frequency dividing information is one in which the expansion module connected to an end opposite the basic module in the n connected expansion modules returns a repetitive pulse signal in which the m-time (m is a positive integer) frequency dividing is performed to a repetitive pulse signal from the direction of the basic module, the m-time frequency-divided repetitive pulse signal being output to the opposite direction to the basic module.

7. A module connecting system in which n (n is a positive integer) expansion modules are connected to one basic module, wherein the basic module outputs a repetitive pulse signal an expansion module that is connected adjacent to the basic module in the n connected expansion modules, the basic module obtains a frequency dividing information output from the expansion module that is connected adjacent to the basic module in the n connected expansion modules, and the basic module determines the number of connected expansion modules, the expansion module performs m-time (m is a positive integer) frequency dividing to a repetitive pulse signal from a direction of the basic module to output the m-time frequency-divided repetitive pulse signal to an opposite direction to the basic module, and the expansion module outputs frequency dividing information from the opposite direction to the basic module to the direction of the basic module.

8. The module connecting system according to claim 7, wherein the frequency dividing information is a result of logical multiplication of a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and a repetitive pulse signal output as frequency dividing information from the opposite direction to the basic module, and the basic module determines the number of connected expansion modules from a pulse duty ratio obtained from a result of logical multiplication of a repetitive pulse signal output to the expansion module that is connected adjacent to the basic module in the n connected expansion modules and a repetitive pulse signal output as frequency dividing information from the expansion module that is connected adjacent to the basic module in the n connected expansion modules.

9. The module connecting system according to claim 7, wherein the frequency dividing information is one in which the expansion module connected to an end opposite the basic module in the n connected expansion modules returns a repetitive pulse signal in which the m-time (m is a positive integer) frequency dividing is performed to a repetitive pulse signal from the direction of the basic module, the m-time frequency-divided repetitive pulse signal being output to the opposite direction to the basic module, and the basic module determines the number of connected expansion module from a frequency dividing ratio of a repetitive pulse signal output as frequency dividing information from the expansion module that is connected adjacent to the basic module in the n connected expansion modules to the repetitive pulse signal output to the expansion module that is connected adjacent to the basic module in the n connected expansion modules.

* * * * *